United States Patent

Mueller et al.

[15] 3,700,751

[45] Oct. 24, 1972

[54] MOLDING MATERIAL FROM POLYAMIDE AND ACRYLIC ESTER OF A T-ALIPHATIC ALCOHOL

[72] Inventors: Gerhard Mueller, 40 Kastanienweg, Wesseling; Helmut Doerfel, 7 Edenkobener Strasse, Ludwigshafen/Rhein; Georg Schmidt-Thomee, 5 Werrgasse, Heidelberg, all of Germany

[22] Filed: June 11, 1968

[21] Appl. No.: 735,961

[30] Foreign Application Priority Data

June 19, 1967 Germany..........P 16 69 702.2

[52] U.S. Cl. ..............260/857 L, 260/78 R, 264/349
[51] Int. Cl. .............................................C08g 41/04
[58] Field of Search ..........................260/857, 837 L

[56] References Cited

UNITED STATES PATENTS 3,261,885   7/1966   Craubner et al...........260/857

FOREIGN PATENTS OR APPLICATIONS 740,501   8/1966   Canada......................260/857
919,098   2/1963   Great Britain.............260/857

*Primary Examiner*—Paul Lieberman
*Attorney*—Johnston, Root, O'Keefe, Keil, Thompson & Shurtleff

[57] ABSTRACT

Impact-resistant thermoplastic molding material based on polyamides and olefin polymers and methods for the production of the same by mixing polyamides and copolymers of an olefin and an acrylic and/or methacrylic ester of a tertiary alcohol under the action of shearing forces with simultaneous removal of gaseous elimination products.

5 Claims, No Drawings

MOLDING MATERIAL FROM POLYAMIDE AND ACRYLIC ESTER OF A T-ALIPHATIC ALCOHOL

This invention relates to a process for the production of polyamide plastics having improved impact resistance.

The impact resistance of polyamide moldings depends considerably on their water content. In the anhydrous condition, for example after they have been made by injection techniques, the moldings are relatively sensitive to impact stress, particularly those made from easily flowing injection molding material having medium molecular weight and above all those made from highly crystalline polyamides. There is therefore a demand for easily flowing polyamide plastics which can be processed quickly and from which moldings can be prepared which have improved impact resistance in the dry condition. Moreover it is of general interest to develop plastics in which the valuable properties of polyamides (such as their high tensile strength, high thermal stability, good resistance to solvents and easy processability) are combined with high impact resistance and flexiblity.

Various methods for increasing the toughness and flexiblity of polyamides are already known. Incorporation of low molecular weight plasticizers into polyamides does not provide a satisfactory solution of the problem for various reasons. Most of the plasticizers suitable for plastics are not sufficiently compatible with polyamides and separate out from the mixture during processing or tend to exude. Compatible plasticizers which form true solutions with polyamides usually affect the mechanical properties of polyamides. While strongly polar substances having a low molecular weight such as water or dimethylformamide exhibit a strong plasticizing effect they cannot be incorporated until after the polyamide moldings have been made because when pretreated polyamide granulate is used, moldings containing bubbles are formed because of the relatively low boiling point of the plasticizers. Moreover, owing to their relatively high vapor pressure, the plasticizers escape to some extent from the polyamide moldings treated in this way.

According to other methods the impact resistance of polyamides is improved by mixing polymerized substances such as polyethylene and copolymers of vinyl acetate and ethylene with the polyamides. Production of such mixtures from the components requires very intense kneading but for all that partial demixing takes place in processing, for example in injection molding. Moldings prepared from such mixtures exhibit marked stress whitening.

According to another method the flexibility of polyamides is increased by incorporating polyolefins containing acid groups, such as copolymers of olefins and unsaturated acids, or polyolefins grafted with unsaturated acids. Although such mixtures are more finely dispersed and exhibit far less stress whitening than similar mixtures not having acid groups in the polyolefin component, they have (apart from the improved toughness and flexibility) considerably inferior mechanical properties such as modulus of elasticity, tensile strength, hardness, stiffness and the like to the polyamide molding materials used for their production. The relatively difficult accessibility of polyolefin components bearing acid groups as compared with the accessibility of polyolefins having neutral groups is also a disadvantage.

We have now found that impact-resistant thermoplastic molding material which does not have the said disadvantages can be prepared from polyamides and olefin polymers by allowing a shear rate of at least 250 seconds$^{-1}$ to act on a mixture of: 1. 60 to 99 parts by weight of synthetic polyamide having repeating

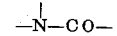

units as integral components of the main molecular chain and 2. 1 to 40 parts by weight of a copolymer of an olefin and the acrylic and/or methacrylic ester of a tertiary alcohol at 200° to 320°C with simultaneous removal of gaseous elimination products, for 30 to 250 seconds.

According to a particularly advantageous embodiment the process is carried out in a double screw extruder at a temperature of from 260° to 290°C. Other mixing equipment which is suitable for plasticizing may also be used.

For the purpose of this invention, polyamides include linear polymers of lactams having six to 12 carbon atoms, conventional polycondensates of diamines and dicarboxylic acids, such as 6,6,6,8, 6,9, 6,10, 6,12, 8,8 and 12,12 nylon, polycondensates of aromatic dicarboxylic acids such as isophthalic acid or terephthalic acid with diamines such as hexamethylenediamine or octamethylenediamine, polycondensates of araliphatic starting materials such as polyamides from m-xylylendiamine and/or p-xylylendiamine and adipic acid, suberic acid or sebacic acid, and the polycondensates based on alicyclic starting materials such as cyclohexane dicarboxylic acid, cyclohexane diacetic acid or 4,4'-diaminodicyclohexylmethane.

It is preferred to use nylon 6 and nylon 6,6. The molecular weight of the polyamides is from 10,000 to 50,000 and preferably from 15,000 to 40,000.

Copolymers for the purpose of the present invention include polymers obtained in known manner from olefins, particularly aliphatic olefins having two to six carbon atoms such as propylene, butylene-1, butylene-2, isobutylene and particularly ethylene, and acrylic esters and/or methacrylic esters of tertiary alcohols particularly aliphatic alcohols having four to eight carbon atoms such as tert-butyl acrylate, tert-butyl methacrylate, tert-amyl acrylate or tert-amyl methacrylate, whose melt index MF I$_2$ (measured according to ASTM D 1238-57 T at 190°C) is up to 25 g/10 minutes, preferably from 4.5 to 12 g/10 minutes. The mixtures contain 1 to 40 percent, preferably 2.5 to 25 percent by weight of the copolymer in which 1 to 10 mole percent, preferably 2 to 8 mole percent of the polymerized monomer units in the copolymer are units of the acrylic or methacrylic ester of a tertiary alcohol.

The starting mixture is processed at a temperature higher than the melting point of the polyamide used, advantageously at 200° to 320°C, particularly from 260° to 290°C. The gaseous elimination products formed (isoolefins formed by pyrolysis from the tertiary alcohols combined in the acrylic esters or methacrylic esters) are continuously removed. Small amounts of catalysts such as mineral acids, particularly phosphoric acids and acid phosphates, sulfonic acids and other acid compounds, may be added in the production of the molding material.

Conventional screw machines are suitable for producing a shear rate of which the molding material according to this invention can be prepared. Machines which have a single screw and particularly those having twin screws may be used. Not only the shape of the screw (i.e. the length and depth of the thread) but especially the distance between the crest of the screw and the casing or (in the case of double screws) the distance between the two screws is decisive in the definition of the shear rate. For the purposes of this invention the quotient of the peripheral speed of the screw and the distance from the wall of the casing is used to define the shear rate. This quotient has the dimension (cm/sec) : cm = second$^{-1}$. According to this invention the components have to be exposed for from 30 to 250 seconds to a shear rate of at least 250 seconds $^{-1}$. The product is discharged in strand form and is cooled, granulated and dried in the conventional manner.

Stabilizers, mold release agents, slip agents, crystallization accelerators, plasticizers, pigments, dyes or fillers such as glass fibers or asbestos may be incorporated into the thermoplastic molding materials containing amide groups, in addition to olefin copolymers.

The process makes it possible to prepare alloys of polymers containing amide groups in which the components of the mixture are present in particularly fine dispersion.

Monofils and other moldings from such alloys do not exhibit any stress whitening at the points where they are broken or cut, nor do they exhibit any demixing. As compared with moldings of prior art mixtures of polyamides and polyolefins they have a very good surface. Moreover as compared with moldings of polycondensates containing merely amide groups they have lower water absorptivity and solubility and swellability in conventional solvent and, depending on the concentration of the polyolefin component, they have a greatly increased dry impact resistance. The molding material is suitable for extrusion or injection molding of such articles as casings, boards, sheeting, film, filaments, threads, strips and tubes, and it can be used for blow molding bottles.

The invention is illustrated by the following Examples. The parts specified are parts by weight. The K values given have been determined by the methods of H.Fikentscher, Cellulose-Chemie, 13, 58 et seq. (1932).

EXAMPLE 1

5 parts of a copolymer of ethylene and 3.4 mole percent of tert-butyl acrylate, which has a MFI$_2$ of 4.9 g/10 minutes, is kneaded with 95 parts of polycaprolactam having a K value of 72 (measured in concentrated sulfuric acid at 25°C) at 260° to 280°C in a disc kneader and extruded. The extrudate is cooled with water, granulated and then dried to a water content of 0.05 percent by weight in vacuo at 80°C.

Other molding materials are prepared from 90 and 75 parts of polycaprolactam and 10 and 25 parts of a copolymer of ethylene and 3.4 mole percent of tert-butyl acrylate.

The molding materials are white opaque products which when injection molded into test specimens have the following properties:

| | Content of copolymer in parts of weight:- | | | |
|---|---|---|---|---|
| | 0 | 5 | 10 | 25 |
| tensile strength (kg/cm²) | 785 | 711 | 649 | 500 |
| tear resistance (kg/cm²) | 462 | 470 | 459 | 436 |
| elongation (%) | 69 | 99 | 132 | 243 |
| dry notched impact strength+ | 2.0 | 7.2 | 14.6 | 24.5 |
| flexural stress (kg/cm²) | 1158 | 1048 | 9.14 | 690 |

+measured in cm kg/cm² after having been dried for forty-eight hours over P$_2$O$_5$ at 1 to 3 mm.

EXAMPLE 2

Polycaprolactam having a K value of 72 is homogenized in the manner described in Example 1 with 5, 10 and 25 parts of a copolymer of ethylene and 5.3 mole percent of tert-butyl acrylate in an extruder at 260° to 280°C with degassing. Molding material having the following properties is obtained:

| | Content in parts by weight of copolymer with 5.3 mole% of tert-butyl acrylate: | | |
|---|---|---|---|
| | 5 | 10 | 25 |
| tensile strength (kg/cm²) | 743 | 667 | 542 |
| tear resistance (kg/cm²) | 476 | 467 | 433 |
| elongation (%) | 119 | 162 | 215 |
| dry notched impact strength+ | 4.7 | 14.1 | 20.4 |
| flexural stress (kg/cm²) | 1066 | 934 | 712 |

+measured in cm kg/cm² after having been dried for forty-eight hours over P$_2$O$_5$ at 1 to 3 mm.

EXAMPLE 3

Polycaprolactam having a K value of 72 is kneaded intensely with 5, 10 and 25 parts of a copolymer of ethylene and tert-butyl acrylate which contains 6.9 mole percent of units of tert-butyl acrylate in the manner described in Example 1. The properties of these products are given in the following table:

| | Content in parts by weight of copolymer with 6.9 mole% of tert-butyl acrylate: | | |
|---|---|---|---|
| | 5 | 10 | 25 |
| tensile strength (kg/cm²) | 761 | 739 | 566 |
| tear resistance (kg/cm²) | 465 | 448 | 335 |
| elongation (%) | 97 | 76 | 149 |
| dry notched impact strength (cm kg/cm²) | 3.8 | 7.7 | 37.0 |
| flexural stress (kg/cm²) | 1068 | 1020 | 714 |

EXAMPLE 4

80 parts of polyhexamethylene adipamide having a K value of 72 is intensely kneaded at 270° to 280°C in an extruder with a copolymer of ethylene and tert-butyl acrylate containing 3.4, 4.0, 5.3 or 6.9 mole percent of units of tert-butyl acrylate. The product is cooled with water, granulated and dried as described in Example 1. The molding materials are white opaque products in which the copolymers are present as finely dispersed particles in the polyamide phase. Granulates prepared from these products are processed into test specimens. The properties of these molding materials as compared with that of the polyhexamethylene adipamide used for its preparation are given in the following table:

In the table the molding materials composed of 80 parts of nylon 6,6 and 20 parts of copolymer having 3.4, 4.0, 5.3 and 6.9 mole percent of tert-butyl acrylate are indicated by 3.4, 4.0, 5.3 and 6.9. 6,6 indicated the nylon 6,6 alone.

|  | 6,6 | 3.4 | 4.0 | 5.3 | 6.9 |
|---|---|---|---|---|---|
| tensile strength (kg/cm²) | 872 | 586 | 593 | 589 | 581 |
| tear resistance (kg/cm²) | 569 | 480 | 479 | 497 | 502 |
| elongation (%) | 41 | 40 | 41 | 51 | 52 |
| dry notched impact strength | 2.0 | 11.5 | 13.4 | 14.5 | 15.2 |
| flexural stress (kg/cm²) | 1292 | 792 | 806 | 796 | 776 |

Similar results are obtained when the molding materials are prepared as described in Example 4, but copolymers of ethylene and 3.4, 4.0, 5.3 and 6.9 mole percent of the ester of methacrylic acid and tertiary amyl alcohol are used.

We claim:

1. A process for the production of impact-resistant thermoplastic molding material which process consists essentially of mixing components consisting of:
   1. 60 to 99 parts by weight of a thermoplastic synthetic polyamide having repeating

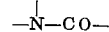

units as integral components of the main molecular chain,
   2. 1 to 40 parts by weight of a copolymer of an aliphatic olefin and 1 to 10 mole percent of the acrylic or methacrylic ester of a tertiary aliphatic alcohol, and
   3. optionally minor amounts of mineral acids, acid phosphates, stabilizers, mold relay agents, slip agents, crystallization accelerators, plasticizers, pigments, dyes and fillers at a shear rate of at least 250 seconds$^{-1}$ at from 200° to 320°C for from 30 to 250 seconds with the simultaneous removal of gaseous elimination products.

2. A process as claimed in claim 1 wherein a copolymer of ethylene and 1 to 10 mole percent of tert-butyl acrylate is used.

3. A process as claimed in claim 1 wherein a copolymer of ethylene and 1 to 10 mole percent of tert-butyl methacrylate is used.

4. A process as claimed in claim 1 wherein polycaprolactam is used as the polyamide.

5. A process as claimed in claim 1 wherein polyhexamethylene-adipamide is used as the polyamide.

* * * * *